United States Patent Office 2,705,700
Patented Apr. 5, 1955

2,705,700

COMPOSITION CONTAINING SURFACE-ESTERIFIED SILICEOUS SOLID AND SILICONE OIL

Ralph K. Iler, Brandywine Hundred, Del., assignor to E. I. du Pont de Nemours and Company, Wilmington, Del., a corporation of Delaware No Drawing. Application April 1, 1952, Serial No. 279,908

15 Claims. (Cl. 252—28)

This invention relates to novel compositions comprising an estersil and a silicone oil, and in a preferred aspect is directed to lubricating compositions which are highly resistant to physical deterioration by water and which contain an estersil, a silicone oil, and another water-insoluble lubricating oil.

This application is a continuation-in-part of my copending United States applications Serial No. 171,760, filed July 1, 1950, now abandoned, and Serial No. 191,717, filed October 21, 1950, now U. S. Patent No. 2,676,148. In the former application I have described certain compositions containing estersils, a novel class of surface-esterified, supercolloidal, particulate siliceous materials disclosed and claimed in my United States application Serial No. 171,759, filed July 1, 1950, now abandoned. More particularly, an estersil is an organophilic solid in a supercolloidal state of subdivision, having an internal structure of inorganic siliceous material with a specific surface area of at least 1 m.²/g., having chemically bound to said internal structure —OR groups wherein R is a hydrocarbon radical, wherein the carbon atom attached to oxygen is also attached to at least 1 hydrogen, each —OR group having from 2 to 18 carbon atoms.

In my above-mentioned applications, Serial Nos. 171,760 and 191,717, I have disclosed that estersils may be used to thicken lubricating oils, thereby producing lubricating greases. The present application is directed particularly to such greases which are adapted for use under conditions requiring a high degree of resistance to deterioration by water.

A grease is ordinarily made by thickening a lubricating oil with a thickening agent such as a soap. Greases made with many such conventional thickeners are quite sensitive to moisture and at high relative humidities, even though no liquid water may be present, show signs of deterioration. Lack of water resistance is manifested by such changes as loss of clarity, thinning of the grease upon standing in contact with high relative humidity, and actual separation of oil and thickening agent. When the latter change occurs the grease loses body and becomes practically valueless for its intended purposes.

By using an estersil as the thickening agent for a lubricating oil as described in my above-mentioned application Serial No. 191,717, greases are produced which are resistant to high relative humidities. They can be stored for long periods in water-saturated atmospheres without showing signs of deterioration and can therefore be said to have water resistance. On the other hand, there are extreme conditions of use, such as in the lubrication of bearings on drum dryers and similar chemical equipment, where the greases must be in contact with liquid water at or near the boiling point, and under these conditions even greases made by thickening ordinary lubricating oils with estersils do not have the desired degree of water resistance.

Now according to the present invention I have found that silicone oils can be thickened with estersils to give greases of extreme water resistance. The silicone oil component of such greases is quite expensive and is not as efficient a lubricant as the more common hydrocarbon oils, and hence preferred aspects of the invention are directed to estersil compositions containing a small proportion of silicone oil adapted to be mixed with a larger proportion of another lubricating oil, and to the three-component greases, produced by such admixture, containing an estersil, a silicone oil, and another water-insoluble lubricating oil.

In producing water resistance, the combination of an estersil and a silicone oil appears to be synergistic, since it has been found that the desired degree of water resistance cannot be imparted to an ordinary finely divided, non-esterified siliceous thickener by adding a silicone oil thereto. Likewise, a grease made with non-esterified silica and silicone oil together with another lubricating oil such as hydrocarbon oil is similarly lacking in resistance to water under extreme conditions. Whether this synergism is due to an orientation among the estersil, the silicone oil, and the lubricating oil or is to be accounted for on other grounds is not entirely clear; suffice it to say that the synergistic effect is easily observable in practical tests such as by placing a sample of the grease in boiling water and noting the time required for the boiling water to cause thinning and separation of the grease into its component parts.

THE ESTERSIL

Estersils suitable for use in the compositions of the present invention may be prepared by esterifying an inorganic siliceous material having a specific surface area of at least 1 m.²/g. with a primary or secondary alcohol in which the hydrocarbon radicals have from 2 to 18 carbon atoms, as described in my above-mentioned application Serial No. 171,759. While the siliceous material which acts as a substrate for the estersil may have a specific surface area of as little as 1 m.²/g., it is preferred to use estersils in which the substrate has a specific surface area of at least 25 m.²/g.

1. *The substrate*

The materials used to form the skeleton or internal structure, the substrate, of the estersils used in the compositions and methods of the invention are solid inorganic siliceous materials. They contain substantially no chemically bound organic groups. They have reactive surfaces which I believe to result from surface silanol (—SiOH) groups. The substrate materials can be mineral or synthetic in origin. They can be amorphous silica. They can be water insoluble metal silicates. They can be water insoluble metal silicates coated with amorphous silica.

The substrate particles are aggregates of ultimate units; they have at least one dimension of at least 150 millimicrons, thus they are in a supercolloidal state of subdivision. Preferably the substrate particles are coherent aggregates, that is, they are made up of tiny ultimate units which are so firmly attached to each other that they are not readily separated by simple stirring in fluid medium. For the purposes of this invention, substrate particles in which the ultimate units have an average diameter of 10 to 100 millimicrons or ultimate units below 10 millimicrons diameter joined in very open networks (large pore size) are preferred. Preferably the substrate particles have an average diameter of at least 1 micron.

Preferably, the inorganic siliceous solids used are porous, that is, they have exposed surfaces in the interior of the particle which are connected to the exterior so that liquids and gases can penetrate the pores and reach the exposed surfaces of the pore walls. In other words, the solid forms a three-dimensional network or webwork thru which the pores or voids or interstices extend as a labyrinth of passages or open spaces.

Especially preferred are porous inorganic siliceous solids having average pore diameters of at least four millimicrons.

The substrate particles have large surface areas in relation to their mass. The term used herein and the one normally so used in the art to express the relationship of surface area to mass is "specific surface area." Numerically, specific surface area will be expressed in square meters per gram (m.$^2$/g.).

According to the present invention, the substrate particles have an average specific surface area of at least 1 m.$^2$/g. and, preferably, the specific surface area is at least 25 m.$^2$/g. and still more preferably 200 m.$^2$/g. In the case of precipitated amorphous silica, a preferred substrate material, there is an optimum range of about 200 to 400 m.$^2$/g. Very voluminous siliceous aerogels having surface areas as great as 900 m.$^2$/g., and preferably from 200 to 900 m.$^2$/g., are very suitable for use as substrate materials because of their greater thickening efficiency.

Specific surface area, as referred to herein, is determined by the accepted nitrogen adsorption method described in an article "A new method for measuring the surface areas of finely divided materials and for determining the size of particles" by T. H. Emmett, in "Symposium on New Methods for Particle Size Determination in Sub-Sieve Range," published by the American Society for Testing Materials, March 1941, page 95. The value of 0.162 square millimicron for the area covered by one surface-adsorbed nitrogen molecule is used in calculating the specific surface areas.

Pore diameter values are obtained by first determining pore volume from nitrogen adsorption isotherms, as described by Holmes and Emmett in "Journal of Physical and Colloid Chemistry," 51, 1262 (1947). From the volume figure, the diameters are obtained by simple geometry assuming cylindrical pore structure.

Determinations of gross particle size and shape of substrate material are suitably made by a number of standard methods whose choice for use in a particular case depends upon the approximate size and shape of the particles and the degree of accuracy desired. Thus for coarse materials, the dimensions of individual particles or coherent aggregates can be determined with the unaided eye and ruler or calipers. For more finely powdered material, the light microscope is used with a calibrated scale. For material having a particle size in the range of from 2 or 3 microns down to 5 millimicrons, the electron microscope is used. Particle size determination using an electron microscope is described in detail by J. H. L. Watson in "Analytical Chemistry," 20, page 576 (June 1948).

While various inorganic siliceous solids having the aforementioned properties can be used as substrate materials in preparation of estersils for use in the oil-grease compositions of the invention, precipitated amorphous silica is especially preferred. Such silica is characterized by X-rays as lacking crystalline structure.

The preferred amorphous silica consists of coherent aggregates of non-porous ultimate units in which the ultimate units are quite uniform in size and have an average diameter of 10 to 100 millimicrons. Such coherent aggregates have a relatively "loose" structure and contain pores of at least 4 millimicrons average diameter as determined by nitrogen adsorption curves. The large pores afford easy access by alcohol molecules in the subsequent esterification to give estersils.

The preparation of a variety of suitable amorphous silicas is illustrated in the examples. For a detailed discussion of sources of amorphous silica for use in preparing estersils, reference should be had to my copending application Serial No. 171,759, filed July 1, 1950.

Instead of silica, water-insoluble metal silicates can be used as the substrate. Such metal silicates can be prepared, as is well known in the prior art, by treatment of silicas with metal salts or hydrous metal oxides, excluding those containing only alkali metal ions. Such metal silicates can be prepared so as to have a large number of silanol (—SiOH) groups on the surface of the particles. Thus metal silicates having a large proportion of metal ions on the surface may be activated for esterification by washing with acids to remove a portion of the metal ions and leave surface silanol groups.

Crystalline metal silicates occurring in nature can also be used. However, the proportion of silanol groups on most minerals is very small since the surfaces also contain metal hydroxide groups, silicon oxygen groups and adsorbed metal ions. Therefore before esterification, it is necessary to introduce silanol groups on the surface. Loosely adsorbed metal ions may be exchanged for hydrogen ions by washing with dilute acids, or by treatment with ion exchange resins. In some cases, more vigorous treatment, such as reaction with acids at low pH and often at elevated temperatures are required in order to give a material which will contain a sufficient number of silanol groups in the surface to yield an organophilic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particles. Such methods are illustrated in the examples of my aforementioned copending application on estersils.

Mineral crystalline silicates which can be used in preparing the substrate particles are: the asbestos minerals, such as chrysotile asbestos and serpentine (hydrous magnesium silicates), and amphiboles, such as crocidolite asbestos (a sodium magnesium iron silicate), amosite (an iron silicate), tremolite (a calcium magnesium silicate), and anthothyllite (a magnesium iron silicate); clay minerals, such as halloysite (an aluminum silicate), attapulgite (a magnesium aluminum silicate), hectorite (a magnesium lithium silicate), nontronite (a magnesium aluminum iron silicate); kaolines, such as kaolinite, nacrite, and dickite (aluminum silicates), and bentonites, such as, beidillite, saponite, and montmorillonite (magnesium aluminum iron silicates); and micaceous minerals, such as, phlogopite (a potassium magnesium aluminum silicate), muscovite (a potassium aluminum silicate), biotite (a potassium iron aluminum silicate) and vermiculite (a hydrous magnesium iron aluminum silicate).

2. The esterifying agents

The inorganic siliceous solids described above are reacted with primary and secondary monohydric alcohols to give the estersils used in the compositions of the invention. Such alcohols, called the esterifying agents, are represented by the formula ROH where R is an hydrocarbon radical wherein the carbon attached to oxygen is also attached to at least one hydrogen atom.

Examples of compounds of this class are: Normal straight chain alcohols, such as ethyl, n-propyl, n-butyl, n-pentyl (amyl), n-hexyl, n-heptyl, n-octyl, n-nonyl, n-decyl, n-undecyl, n-dodecyl (lauryl), n-tetradecyl myristyl), n-hexadecyl (cetyl), n-octadecyl (stearyl); branched chain primary alcohols such as isobutyl (2-methyl-1-propanol), isoamyl (3-methyl-1-butanol), 2,2,4,trimethyl hexane-1-ol and 5,7,7,trimethyl, 2(1,3,3-trimethyl butyl)octane-1-ol; secondary alcohols such as isopropyl, sec.-butyl (2-butanol), sec.-amyl (2-pentanol), sec.-n-octyl (methyl hexyl carbinol or 2-octanol), methyl isobutyl carbinol, and di-iso-propyl carbinol (2,4-dimethyl pentane-3-ol); alicyclic alcohols such as cyclopentanol, cyclohexanol, cycloheptanol (suberol), and menthol; alcohols having ethylenic unsaturations such as allyl (2-propene-1-ol), crotyl (2-butene-1-ol), oleyl (cis-9-octadecen-1-ol), citronellol (3,7-dimethyl-6 (or 7) octen-1-ol), and geraniol (3,7-dimethyl-2,6-octadien-1-ol); compounds having acetylenic unsaturation such as propargyl alcohol (2-propyn-1-ol); and aromatic (araliphatic) alcohols such as benzyl (phenyl carbinol), beta-phenyl-ethyl (2-phenyl-ethanol), hydrocinnamyl (3-phenyl-1-propanol), alpha-methyl-benzyl (1-phenyl-ethanol), and cinnamyl (3-phenyl-2-propene-1-ol).

The saturated aliphatic primary and secondary alcohols are preferred. In other words, the preferred ester group is alkoxy.

The saturated primary aliphatic alcohols are especially preferred esterifying agents because they react more readily with the inorganic siliceous materials at lower temperatures than do the secondary alcohols and are more stable than the unsaturated alcohols at the temperature of the reaction.

The unsaturated alcohols, especially those containing one or more triple bonds or multiple double bonds are difficult to use because of their instability. While many of the unsaturated alcohols which are not particularly unstable under the esterification conditions can be used, those alcohols which are known to polymerize, crack, or otherwise decompose under the conditions of temperature, pressure, etc. of the esterification obviously should be avoided.

Technically, there is no upper limit to the number of carbon atoms which may be present in the esterifying agent. As a practical matter, however, the group of alcohols having 2 to 18 carbon atoms include the majority of commercially available monohydric alcohols and offer a selection of molecule sizes which should be adequate for any purpose.

Alcohols containing from 3 to 6 carbon atoms are especially preferred because they are relatively low boiling liquids which are most readily handled in the process, and when present as unreacted excess can be most readily removed from the esterified product by drying in a vacuum oven without the necessity of extraction procedures. Additionally, they are also the most economical to use and yield a product having a low ratio of organic matter to silica. Estersils prepared from these alcohols are also particularly stable toward hydrolysis as compared to those prepared from lower alcohols, the methanol esterified siliceous materials yielding greases which disintegrate very rapidly in the standard humidity test.

The esterifying agent need not be a single alcohol. Mixtures of alcohols can be used. For example, a mixture of isobutyl and sec-butyl alcohol can be used. Also, there can be used a mixture of different chain lengths such as is found in technical grades of lauryl alcohol made from cocoanut oil ("Lorol"), technical oleyl alcohol made from lard, and technical stearyl alcohol made from tallow.

3. Esterification

The siliceous substrate to be reacted with alcohol must contain surface silanol groups. Pure amorphous silica which has been in contact with moisture has such a surface. The surface must not be covered with other material which blocks access to the silanol groups. Metal atoms on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica, the external surface of which can then be reacted with alcohol.

The inorganic siliceous solid is preferably freed of extraneous material before esterification and the pH is adjusted to avoid strong acids or alkalies in the reaction. The pH range is preferably 5 to 8.

The amount of water present in the reacting mass during the esterification step has an important bearing on the degree of esterification that will be attained.

In order to esterify sufficiently to obtain organophilic surface modified siliceous products, the water in the liquid phase of the system should not exceed 5% by weight of that phase for a period of time sufficient at the reaction temperature to assure that the reaction has proceeded substantially as far as it will go under the reaction conditions, that is, that it has reached equilibrium. To produce products which are not only organophilic but also hydrophobic, the water content should not exceed about 3%. For maximum esterification, the water content must be kept below about 1.5%; in fact, it is desirable to keep the water content as low as possible.

Because of the hindering effect of water on the esterification, if the siliceous solid to be esterified is wet, the free water must be removed either before the solid is put into the alcohol or alternatively it may be removed by distillation after mixing with the alcohol.

Simple air drying at temperatures from 100 to 150° C. will remove most of the free water. Drying may be hastened by the application of vacuum. For many types of siliceous solids, however, air drying is not satisfactory because they tend to shrink to hard, compact masses upon drying from water.

Water can be suitably removed from a wet siliceous solid before esterification by displacing the water in the wet mass with a polar organic solvent such as acetone. The solvent can later be recovered by evaporation.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with alcohol.

Alternatively, the alcohol which is to be used as the esterifying agent can also be used as the azeotropic dehydrating agent. For example, the water-wet siliceous material can be mixed with n-butanol and the mixture heated to remove the butanol-water azeotrope. The distillate, on condensing, and cooling, splits into an alcohol rich layer and a water rich layer. The alcohol rich layer is returned to the distillation vessel.

The ratio of alcohol and siliceous material to be used in the esterification is limited only by the fact that the alcohol should be present in sufficient excess to facilitate a practical rate of reaction. Preferably, sufficient alcohol is used to provide a slurry of the siliceous material in alcohol which can be readily stirred. Of course, larger portions of alcohol must be used when no water is removed from the system during the reaction, since the reaction liberates water and may exceed the maximum permissible value unless alcohol is added either before or during the reaction step.

When operating at atmospheric pressure, the preferred procedure is to remove water continuously by azeotropic distillation during the reaction. Using this method, it is not necessary to use as large an excess of alcohol as when no water is removed during the reaction.

The esterification reaction is carried out at an elevated temperature. The extent of the reaction is fixed more by the temperature than by the time, that is, at a suitable temperature, the reaction proceeds quite rapidly up to a certain point which is characteristic of the temperature and of the alcohol and thereafter proceeds slowly.

The minimum reaction time and temperature in order to obtain any give extent of reaction varies with the alcohol used. Short chain primary alcohols react more rapidly than long chain alcohols and, in general, primary alcohols react more rapidly and more completely at a given temperature than secondary alcohols. The following table indicates the temperature required for the preparation of a given type of estersil within a practical reaction time such as one or two hours. While it is difficult to set forth in great detail the relationship between the temperature required for any given extent of reaction and the structure of the alcohol, one skilled in the art may learn from the data the general principles involved and conclude what conditions should be used for another alcohol. The data are based on a one-hour reaction time and a water content of the system below 1.5%.

| Estersil Property [1] | Primary Alcohols, degree C. | Secondary Alcohols, degree C. |
|---|---|---|
| Organophilic | 100 | 130 |
| Hydrophobic | 118 | 225 |
| Zero Methyl Red dye adsorption | 190 | 275 |

[1] The meaning and significance of these properties will be discussed in later sections.

Temperatures substantially below about 100° C. are unsuitable. Alcohol can be adsorbed on the siliceous surfaces at such temperatures but true esterification is not obtained.

The esterification temperature should not exceed the thermal decomposition point of the alcohol while in the presence of siliceous solids, nor should it exceed the point of thermal stability of the esterified siliceous materials. Secondary alcohols are not as suitable as primary, some of them being decomposed at temperatures above 300° C. Preferably, the heating is not prolonged any more than is required to achieve esterification equilibrium.

After completion of the esterification, the product estersils can be recovered from the unreacted alcohol by conventional methods. Thus, the separation may be made by filtration since the estersils consist of particles of supercolloidal size which are retained on ordinary filter media. Alternatively, the alcohol may be vaporized by applying vacuum to the reaction vessel. Or where the alcohol is one which will distill at atmospheric pressure without decomposition, simple distillation can be used. In the case of higher alcohols which are not readily distilled, except under very high vacuum, the alcohol can be extracted from the product with a low boiling solvent such as methyl ethyl ketone, chloroform, or ether.

4. Properties of the estersils

The esterified inorganic siliceous solids, the estersils, are in the form of powders or sometimes lumps or cakes which are pulverable under the pressure of the finger or by a light rubbing action. They are generally exceedingly fine, light, fluffy, voluminous powders.

The light, fluffy nature of the preferred estersils can be expressed by the characteristic of bulk density. For ease in dispersion, the estersils preferably used in thickening lubricating oils to obtain the oil and grease compositions of the present invention are those having a bulk density not greater than 0.20 gram per cubic centimeter under a compressive load of 3 lbs./sq. inch, and not greater than 0.30 g./cc. at 78 lbs./sq. inch. However, in certain cases, it may be desirable to use higher bulk density material to facilitate handling The bulk density under compressive load of 3 p. s. i. is determined by placing a weighed amount of powdered estersil in a vertical glass tube which is one-half inch in diameter, ten inches long, and is fitted with a flat fritted glass bottom. A fritted porous glass plug is then rested on top of the powder in the tube. A steel rod weighing about 0.6 lb. is then rested on the glass plug to provide the pressure of 3 lbs./sq. inch. The volume of the estersil is then measured and the bulk density calculated by dividing the known weight (in grams) of the estersil by the measured volume (in cc.) of the estersil at compression equilibrium.

In measuring the bulk densities of the siliceous materials under a compressive load of 78 p. s. i., a weighed sample is introduced into an accurately machined, hollow cylindrical, steel pill press, and pressure is applied to the siliceous material through an accurately fitting solid, steel plunger by means of a hydraulic Carver laboratory press. The pressure is slowly increased to the desired point and the displacement of the plunger is measured by means of a cathetometer reading to $\frac{1}{10}$ of a millimeter. From the known constants of the instrument the volume of the silica under the equilibrium pressure may be calculated. The density is then calculated from the known weight and volume as described above.

The esterification reaction does not substantially change the structure of the inorganic siliceous solid or substrate which was esterified. In other words, the internal structure of the estersil, the structure to which the —OR groups are chemically bound, has substantially the same particle size, surface area, pore diameter, and other characteristics described previously in the discussion of the substrate material. The estersil particles are in a supercolloidal state of subdivision.

All the estersils used in the compositions and methods of the invention are organophilic. By organophilic, I mean that when a pinch of the estersil is shaken in a two-phase liquid system of water and normal butanol in a test tube, the estersil will "wet" into the n-butanol phase in preference to the water phase. In contrast, the unesterified inorganic siliceous solids are not organophilic; when tested in the above manner, they prefer the water phase.

In order to make an inorganic siliceous solid organophilic, it is necessary to react a certain minimum proportion of the surface silanol groups with an alcohol containing at least 2 carbon atoms. With most alcohols, the esterified material becomes organophilic when it contains more than about 80 ester groups per 100 square millimicrons of surface of the internal structure or substrate. The products are markedly organophilic when there are chemically attached more than about 100 ester groups per 100 square millimicrons of substrate surface.

Estersils, tho organophilic, are also hydrophilic unless more highly esterified. Thus while they prefer normal butanol to water in a butanol-water system, they will in the absence of an organic phase wet into water also. The preferred estersils, however, are those which are more highly esterified so that they are not only organophilic but are also hydrophobic, that is, they will not wet into water even in the absence of an organic phase. Such organophilic and hydrophobic products are obtained by esterifying the inorganic siliceous material to give an estersil containing at least 20 ester groups per 100 square millimicrons of substrate surface.

Hydrophobic estersils can be made without esterifying all the surface silanol groups. However, in order to obtain estersils having maximum stability toward hydrolysis, it is necessary that the ester groups be crowded together so closely on the surface that the surface is completely protected. For most ester groups, especially for those containing 3 to 6 carbon atoms, this requires at least about 270 ester groups per 100 square millimicrons. When such a completely protected surface has been obtained, the specific hydroxylated surface area, as measured by the methyl red dye adsorption test described below, is zero; in other words, essentially no methyl red dye will adsorb on the surface of the estersil.

In the case of the preferred alcohols, those containing 3 to 6 carbon atoms, it is possible to force far more than 270 alcohol molecules, say 300 to 400, to react per 100 square millimicrons of surface area of the siliceous substrate by using more severe reaction conditions, care being taken not to decompose the alcohol or resulting ester groups. Such products not only adsorb essentially no methyl red dye but exhibit outstanding stability toward water and certain other chemicals. For example greases prepared from certain of such estersils and mixed in the ratio of 9 to 1 with conventional calcium soap greases do not disintegrate but show excellent water resistant properties in a 7-day storage test at 210° F. and 100% relative humidity.

The methyl red adsorption test is carried out by agitating in 25 cc. of an anhydrous benzene solution containing 0.6 to 0.7 gram of the acid form of methyl red per liter, a suspension of a few tenths of a gram of the dried silica or estersil sample to be tested. No more than about 0.7 g. of the sample should be used in the test, and appreciably less must be used with voluminous samples to avoid getting a mixture too thick to handle. Within the latter limitations, however, the amount of sample used should provide, as near as possible, a total hydroxylated surface area of 10 m.$^2$ in the test.

The test mixture is agitated for about two hours at about 25° C. to reach equilibrium conditions; an equilibrium concentration of 400 milligrams of dye per liter insures saturation adsorption. The decrease in dye concentration in the benzene solution is determined by adsorption spectrophotometric observations at 4750 Å of both the original and equilibrium benzene solutions of methyl red.

The specific hydroxylated surface area in m.$^2$/g. is calculated from the formula $$\frac{\text{Grams dye adsorbed} \times \text{Avogadro's No.} \times 116 \times 10^{-20}}{\text{Grams silica employed} \times \text{molecular weight of methyl red}}$$

where the covering power of each adsorbed methyl red molecule is approximately 1.16 square millimicrons.

The number of ester groups per 100 square millimicrons of siliceous substrate surface is calculated from the expression:

$$\text{surface area} = \frac{6.02 \times 10^{23} \times C}{12n \times S_n 10^{18}} = \frac{50200 \times C}{n \times S_n}$$

where C is the weight of carbon in grams attached to 100 grams of substrate, $n$ is the number of carbon atoms in the —OR groups, $S_n$ is the specific surface area in m.$^2$/g. of the substrate as determined by nitrogen adsorption.

Where the sample to be analyzed is one in which the type of alcohol is unknown, the sample can be decomposed with an acid and the alcohol can be recovered and identified. The specific surface area of the substrate can be determined by first burning off the ester groups as, for example, by slowly heating the estersil in a stream of oxygen up to 500° C. and holding it there for about 3 hours and then rehydrating the surface of the particles by exposure to 100% relative humidity at room temperature for several hours, and finally determining the surface area of the remaining solid by the nitrogen adsorption method.

In estersils, the —OR groups are chemically bound to the substrate. Estersils should not be confused with compositions in which alcohol is merely physically adsorbed on the surface of a siliceous solid. Adsorbed alcohols can be removed by heating the material at relatively low temperatures, for example, 150° C. under high vacuum, for example, 10$^{-5}$ mm. of mercury, for one hour.

In contrast, estersils are stable under such treatment. Neither can the —OR groups of estersils be removed by washing with hot methyl ethyl ketone or similar solvents or by prolonged extraction in a Soxhlet extractor. In the case of ordinary physical adsorption, the alcohol is displaced by such treatment.

THE SILICONE OIL

The silicone oils used with estersils in the compositions of this invention are water-insoluble, substantially non-volatile, liquid polysiloxanes, and any of the commonly known compositions of this type may be employed. Polysiloxanes wherein the organic radical is a low molecular weight aliphatic group such as methyl or ethyl, or wherein a high percentage of low molecular weight aliphatic groups are present, are the types most widely available and have the lowest cost, and are for this reason preferred. Of the available silicone oils those of higher molecular weight are preferred because of their lower volatility, since the compositions of the invention find wide use at elevated temperatures.

Examples of particular silicone oils which may be used are the polymethyl siloxanes having a viscosity of over 50 centistokes at 25° C. (Dow Corning DC–200 series) and polymethyl phenyl siloxanes of medium aromaticity (Dow Corning DC–550 silicone oil). Another commercially available material is known as "General Electric Silicone Oil No. 9981."

The silicone oils, although of only relatively recent commercial importance, are well understood in the art, being described, for instance, in chapter 4 of "Chemistry of the Silicones" by Eugene G. Rochow, 1st Ed., 1946, and further described in chapters 5 and 6 of the 2nd edition of this book, published in 1951. The alkyl, aryl, and alkyl-aryl silicones mentioned as oils in these chapters are suitable for use with estersils according to the present invention.

THE ESTERSIL-SILICONE OIL COMPOSITIONS

The estersil-silicone oil compositions of this invention are made by mixing the estersil and silicone oil together under conditions which insure thorough commingling of the two components. When the silicone oil is the predominant component, this can be accomplished by stirring the estersil into a quantity of the liquid silicone. On the other hand, if the estersil is the predominant ingredient, the silicone may be sprayed onto the estersil in a tumbling barrel or the silicone oil may be diluted with a solvent such as toluene or benzene, and the estersil added to the diluted solution followed by evaporation of the solvent.

Compositions of great usefulness are obtained throughout the entire range of estersil-silicone oil proportions. Compositions in which the estersil is present in predominating proportion appear as dry, free-flowing powders, due to the very high absorptive capacity of the estersil for the oil. Such compositions have major utility as thickeners for another lubricating oil such as a hydrocarbon oil, giving a final product in which the ratio of estersil to silicone oil is in the desired range.

Compositions in which the silicone oil is present in predominating proportion are useful as hydraulic fluids. Such hydraulic fluids can be thickened to the desired degree with estersils and will retain their viscosity over a wide temperature range. With a somewhat greater proportion of estersil than used in the hydraulic fluids, silicone greases are obtained. Such greases have utility per se in that they can be used where extreme resistance to water and steam are required. Such conditions are commonly encountered in chemical apparatus such as in the bearings on rolls of drum dryers. The action of the estersil in thickening the grease is pronounced even with small amounts, and excellent greases have been made using from 5 to 25% of estersil.

It will be noted that the mixing of a silicone oil and an estersil to make a grease may be carried out in a manner which has heretofore been used for introducing other non-soap thickeners into oil. It is well understood in the grease-manufacturing industry that mixing is important and that thorough dispersion of the thickening agent is essential. Paint mills, ink mills, colloid mills, mixers of the sigma-arm type, and similar devices may be used to disperse estersils in the silicone oil.

The degree of water resistance of a grease may be demonstrated by placing a sample of the grease in a quantity of boiling water and observing the time required for turbidity to develop in the grease and also for oil separation to occur. It is found that by this test greases made by thickening a silicone oil with an estersil according to this invention are extremely water resistance.

THE OTHER LUBRICATING OIL

Now while estersils are excellent thickeners for silicone oils and the resulting products are highly useful as above described, silicone oils are expensive and do not have as good lubricating properties as might be wished. I have further found in a specific embodiment of this invention that compositions in which an estersil and a silicone oil are used in combination with another lubricating oil such as a hydrocarbon oil are highly effective and may have as good, or nearly as good, water resistance and at the same time have superior lubricating characteristics and other properties which are desirable in greases.

The other oils, to which reference has just been made, are water-insoluble lubricating oils. Oils which contain, say, 5 to 10% of a water-soluble component or which are themselves soluble to that extent in water can be classed as essentially water-insoluble oils. However, to obtain maximum advantages of the water resistant properties of the estersils used according to this invention, the oil should have as low a solubility in water as possible and preferably should not be soluble in water to the extent of more than about 1%.

A wide variety of oils can be used. In general, any water-insoluble animal, vegetable, mineral, or synthetic chemical having oil characteristics and lubricating or friction-decreasing properties can be used.

Illustrative of suitable water-insoluble lubricating oils are: hydrocarbon oils such as naphthene base oils, paraffin base oils, and petrolatum; fluorocarbon oils such as the perfluorinated petroleum oils; vegetable oils such as cotton seed oil and castor oil; animal oils such as sperm whale oil, lard oil, blown fish oil and degras; and water-insoluble synthetic chemicals having typical oily characteristics such as di(2-ethyl hexyl) adipate, bis-nonyl glutarate, di(2-ethyl hexyl)thiopropionate, di(2-ethyl hexyl) oxydibutarate, propylene oxide-tetrahydrofuram copolymer, di(2-ethyl hexyl)sebacate; and dimethyl cyclohexyl phthalate.

The choice of a water-insoluble lubricating oil to be used is, of course, based on a consideration of the requirements of the field of application of the finished product. The considerations are analogous to those weighed in selection of an oil to be used with conventional soap thickeners. For example, illustrative of matters to be considered in choosing an oil for a given use are cost, maximum and minimum service temperature, oxidation stability, power consumption during bearing operation, chemical reactivity, and bearing enclosure design.

Thus, low cost would be a reason for choosing a petroleum oil of natural origin. Such oil is suitable for most common uses where extreme conditions are not encountered. If low temperature operation were desired, then low pour point, low viscosity, naphthene base petroleum oils, or synthetic di-ester, or polyether type oils would be favored. For high temperature operation, on the other hand, oxidation resistant and high viscosity oils would be suggested. Fluorocarbon oils should be considered where the product is to be used in corrosive chemical surroundings. Low viscosity oils are favored for use in bearings where low power consumption is desired and conversely high viscosity oils are favored where there are high bearing pressures. Tacky compositions obtainable thru the use of very high viscosity oils are used where there is poor mechanical enclosure of bearings.

In order to avoid decomposition of the estersils, the oils used in combination therewith must not contain available, highly acidic or highly basic components.

THE ESTERSIL-SILICONE OIL-LUBRICATING OIL COMPOSITIONS

The estersil-in-silicone oil compositions containing another lubricating oil have properties resembling the two-component estersil-silicone compositions already described, in that they are water resistant and in certain proportions are highly useful greases. However, they have the advantage of inherently low cost and may possess better lubricating characteristics if the added lubricating oil is superior in this regard to the silicone oil.

Again in the three-component system the proportions of ingredients may be widely varied. Considerations already noted for the two-component system may likewise apply to the three-component system—for instance, when a relatively large proportion of the dry powdered estersil is mixed with relatively small proportions of silicone oil and the other lubricating oil compositions are obtained which can subsequently be diluted out with additional lubricating oil to give excellent greases. Similarly, it will ordinarily be desirable that the silicone oil be present in a lesser proportion than the estersil.

More particularly, the exact proportions of estersil, silicone oil, and other oil will be determined by the properties which are desired in the compositions comprising the three components. If a very highly water resistant grease is desired, the amount of silicone oil used will be larger than otherwise. If a very thick grease is desired, the proportion of estersil will be larger than for a thin grease. If a very low-cost grease is desired, the proportion of lubricating oil such as hydrocarbon oil will be as high as possible, commensurate with the degree of water resistance and amount of thickening desired.

It should be observed that estersils are a class of materials in which the individual members of the class may differ considerably as to such properties as surface area and pore diameter. These properties affect substantially the thickening efficiency of the particular estersil. For instance, estersils of high specific surface areas are found to be considerably more effective as thickeners than those of low specific surface area. In speaking of the proportions of the ingredients in a composition of this invention, therefore, it is convenient to relate the proportions to the specific surface area of the estersil being used.

Now although it is possible to improve the water resistance of hydrophobic estersils in organic systems by mixing them with as little as 1 to 2 parts by weight of polysiloxane per 100 parts by weight of hydrophobic estersil per 100 m.²/g. of estersil surface, it is preferred to employ at least 3½ to 4 parts by weight of polysiloxane per 100 parts by weight of hydrophobic estersil per 100 m.²/g. of estersil surface to achieve a product which will yield highly water resistant compositions upon incorporation into such organic systems as lubricating oils. Since the use of more than 10 parts by weight of polysiloxane per 100 parts by weight of hydrophobic estersil per 100 m.²/g. of estersil surface will cause no substantial improvement in water resistance and will, in general, add greatly to the cost of the composition, this amount of polysiloxane is the preferred upper limit in compositions of the invention. In general, using hydrophobic estersils having specific surface area of 25 to 100 m.²/g., from 20 to 40% by weight of hydrophobic estersil is required to give a medium grease consistency with a Mid-Continent solvent-treated petroleum oil. In contrast, the same grease consistency is obtained with the same oil using from 4 to 25% by weight of those hydrophobic estersils having substrates with specific surface areas of 200 to 900 m.²/g.

The manner of mixing the compositions containing the estersil, silicone oil, and another oil is similar to that already described for the estersil-silicone oil mixtures. It will be understood that in greases where a large proportion of hydrocarbon oil is used, the intense mixing of the silicone oil and estersil, with or without a small amount of hydrocarbon oil, may be first carried out and this mixture may then be diluted out with the hydrocarbon oil until the desired consistency is reached.

Using a hydrophobic estersil having a specific surface area of 260 m.²/g., a substrate of amorphous silica consisting of a loose network of non-porous ultimate units, and pores of at least 4 millimicrons average diameter, and esterified with n-butanol so as to contain 370 butoxy groups per square millimicron of surface, it is particularly preferred to use about from 9 to 11 parts by weight of polysiloxane (silicone) oil per 100 parts by weight of hydrophobic estersil to achieve a product which will yield highly water resistant compositions upon incorporation into such organic systems as hydrocarbon lubricating oils to make greases.

The invention will be better understood by reference to the following illustrative examples in addition to those already given.

*Example 1.*—A siliceous substrate for the preparation of an estersil was made as follows:

One volume of a solution of 0.48 N sulfuric acid was added at a uniform rate, over a period of 30 minutes, at a temperature of about 30° C., to three volumes of a solution of sodium silicate, containing 2% $SiO_2$ and having a molar $SiO_2:Na_2O$ ratio of 3.36. The amount of sulfuric acid solution was adjusted so that it was equivalent to 80% of the $Na_2O$ in the original sodium silicate. The pH during this process dropped from 11.3 to about 9. Violent agitation was provided to insure complete and instantaneous mixing. The temperature during the entire reaction was maintained below 40° C. The sodium ion concentration remained below 0.3 N throughout the process. The clear sol resulting from this process step and containing 1.5% $SiO_2$, is called the "heel." This clear sol contains extremely tiny, discrete particles of silica. These particles are near the lower limit of colloidal dimensions and are so small that the solution remains almost water clear (only slight turbidity). They are too small to be measured by the electron microscope method and are less than 5 millimicrons average diameter.

The heel was heated to 95° C. Solutions of sodium silicate and sulfuric acid were added simultaneously at a uniform rate over a period of two hours. The sodium silicate solution contained 10% $SiO_2$ and had a molar $SiO_2:Na_2O$ ratio of 3.36. Enough 4% sulfuric acid solution (approximately equal in volume to the sodium silicate solution) was added so that 80% of the $Na_2O$ in the silicate solution was neutralized during the addition step. The addition of silicate and acid was continued until one part of $SiO_2$ had been added for each part of $SiO_2$ present in the heel. During the additions the pH of the heel slowly rose from 9 to 10 and was then maintained at about 10. Vigorous agitation was employed so that the mixing was essentially instantaneous. The sodium ion concentration remained below 0.3 N throughout the process. This comprises the "build-up" step.

During the heating of the heel and the subsequent addition of silicate and acid, the tiny, discrete particles of the heel increase in size and then become chemically bound together in the form of open networks or coherent aggregates of supercolloidal size wherein the colloidal particles are present as dense ultimate units. The aggregates are precipitated.

To aid filtration, the slurry was further flocculated with a 2% solution of a mixture of cetyl and lauryl trimethylammonium bromide, 0.16% of the mixed compounds being added, based on the weight of the silica. The slurry was filtered and the wet filter cake reslurried in water. The reslurry was adjusted to about pH 7 with dilute sulfuric acid, and then filtered and the filter cake washed with water. The filter cake, obtained on a vacuum filter, contained about 12.5% by weight of $SiO_2$.

A wet cake of precipitated, reinforced coherent aggregates prepared as just described and having a specific surface area of 310 m.²/g. was esterified in the following manner to make an estersil:

Twenty-two hundred fifty grams of the wet cake containing about 300 grams of $SiO_2$ was slurried in 6 liters of normal butanol. The slurry was then dehydrated by azeotropic distillation, the maximum temperature reached in the distilling flask being 116.5° C. and the total operational time for this step of the process being about 13 hours. The slurry was then transferred to a 3-gallon stainless steel autoclave and was heated to 225° C. under autogeneous pressure. The heating cycle required about 2½ hours after which the autoclave was cooled to room temperature. The final water content in the alcohol phase of slurry was 0.20%. The product was then filtered, the filter cake dried on a steam bath to remove practically all of the free butanol, and finally dried at 75° C. in a vacuum oven for 24 hours.

The dry organophilic and hydrophobic product had a specific surface area of 269 m.²/g. and showed no adsorption of methyl red dye. Chemical analysis revealed that the product contained 6.32% carbon and 88.2% $SiO_2$. There were 270 butoxy groups per 100 square millimicrons of surface area of the internal structure. The bulk density was 0.101 g./cc. at 3 p. s. i. above atmospheric pressure.

One hundred twelve grams of the n-butanol esterified silica described above was dispersed in 688 grams of a silicone oil (DC 200, having a viscosity of 100 centistokes at 25° C., produced by the Dow-Corning Corporation), and the mixture was mixed by initially working the silica into the oil in a mortar and pestle until the mixture was fairly homogeneous and then passing the resultant grease through a Kent 3-roll (4-inch by 10-inch rolls) ink mill, with the rolls set for a clearance of 0.0015 inch. Seven passes through the mill were made to insure complete mixing and give a homogeneous product. After the milling, the grease was clear, homogeneous, and buttery. The resulting grease was an excellent clear product with a consistency of 74 as determined at 77° F. A. S. T. M. micropenetration method (A. S. T. M. Bulletin No. 147, August 1947, pages 81–85). In a heat stability test, a sample of the material heated at 300° F. overnight showed no appreciable change in consistency or appearance, thus demonstrating its higher temperature stability. The grease remained excellent in appearance and consistency after a standard humidity test which was carried out as follows:

A sand-blasted 2 x 4" mild steel panel was covered with about a 1/16" thick coating of the grease and was suspended in a humidity box at 100% relative humidity and 120° F. for 150 hours. The grease was then examined for clarity, water adsorption, separation of silica, thinning out, bleeding, or other evidences of attack. The metal was also examined for evidences of corrosion.

It was found that the grease remained excellent in appearance and consistency after this test and was thus highly water resistant.

*Example 2.*—A hydrophobic estersil was prepared as follows:

Four hundred twenty-five pounds of a sodium silicate solution containing 2.39 grams SiO$_2$ per 100 milliliters of solution and having a molar SiO$_2$:Na$_2$O ratio of 3.25:1 was charged to a 100-gallon steel tank equipped with a one-half horsepower 400 R. P. M. "Lightnin" mixer driving a 10" diameter, 3-bladed propellor. The silicate was heated to a temperature of 35±2° C. by steam injection. A sufficient amount (about 162 pounds) of a solution containing 2.40% H$_2$SO$_4$ was added uniformly over a period of about 30 minutes to bring the pH to 9.7±0.2 as measured at 25° C. During this period, the temperature of the reacting mass was maintained below 40° C. The clear sol thus obtained was heated to 95° C. over about 15 minutes.

Solutions of sodium silicate and sulfuric acid were then added simultaneously at a uniform rate over a period of 2 hours through inlets located close to the vortex formed by the agitator. Eighty-five and four-tenths pounds of the sodium silicate solution were used, which contained 13.22 grams of SiO$_2$ per 100 milliliters of solution and had a molar SiO$_2$:Na$_2$O ratio of 3.25:1. The sulfuric acid was 4.65% aqueous solution and was added in an amount to maintain the pH of the reaction mixture at 10.3±2 at 25° C. throughout the course of the reaction. Such an amount is sufficient to neutralize about 80% of the Na$_2$O in the silicate solution and maintain the sodium ion concentration below 0.3 normal throughout the process. The temperature was maintained at 95° C. throughout the addition of acid and silicate.

Still maintaining a temperature of 95° C., the pH of the solution was adjusted from 10.3 to 5.0 by adding 4.65% sulfuric acid at a rate of about 0.24 gallon per minute for 20 minutes and then adding small portions followed by repeated pH determinations until the pH was 5 at 25° C. This required about 32 pounds of the sulfuric acid solution.

The slurry thus obtained was then maintained at 85–95° C. without agitation for 16 hours in order to coagulate the precipitate to aid in filtration. The precipitate was filtered in several portions on a 50-gallon Nutsche, using nylon cloth as a filter medium. The filter cake was washed on the filter with 5 displacements of cold water, and then sucked as dry as possible. The final filter cake contained between 6 and 7% solids.

The washed filter cakes were then combined and sufficient normal butanol was slurried with the wet cake to give a normal butanol-water azeotrope plus sufficient excess butanol to leave a slurry containing 9 to 10% solids after complete water removal. This mix was then charged to a still for azeotropic dehydration. The still consisted of a 75-gallon reboiler, a 20', 6" diameter column packed with ½" Raschig rings, an overhead condenser, and a decanter which returned the butanol-rich upper layer to the column as reflux and separated the heavier water-rich layer. The slurry was then dehydrated azeotropically until the water content of the slurry was below 0.1% by Fischer analysis, and actually around 0.05%.

The butanol slurry was then transferred in 20–22# portions to a 4-gallon nickel stirred autoclave and heated to 290–300° C. under autogenous pressure. The heat-up required about 3 hours. The temperature was then maintained at 290–300° C. for 15–20 minutes and cooled rapidly to below 100° C. over 15–30 minutes.

The slurry was removed from the autoclave and dried in a vacuum oven at 110° C. and 10–20 mm. Hg pressure until the silica reached constant weight. Three separate precipitation and azeotropic dehydration batches were prepared as above described and esterified in the autoclave in 25 separate batches. All of the resultant material was then blended to give a homogeneous sample which was a fluffy white powder and was organophilic and hydrophobic. It had a specific surface area of 260 m.$^2$/g. Analysis showed that the product contained 7.8% carbon, which corresponded to 370 butyl ester groups per 100 sq. millimicrons of silica surface.

A grease was made from the hydrophobic estersil prepared as just described, in the following manner:

Thirteen and three-tenths parts by weight of the above hydrophobic estersil were weighed in a beaker, and 5 parts by weight of polymethyl phenylsiloxane of medium aromaticity (Dow Corning DC–550) were added. Eighty-one and seven-tenths parts by weight of a Mid-Continent solvent-extracted petroleum oil having a viscosity of 300 Saybolt Universal seconds at 100° F. was then added to the hydrophobic estersil-silicone oil mix and the three-component system premixed as well as possible with the aid of a spatula. The premix was then passed through a Kent 3-roll inkmill (roll diameter 4"), seven times with the rolls set at 0.0015-inch clearance. A clear lubricating grease was thus obtained which had a micropenetration of 71 at 77° F. A portion of this grease was placed in boiling water under a reflux condenser, and after 90 days' exposure there was no separation of the oil from the thickening phase nor any substantial emulsification of water in the grease. A separate portion of the lubricating grease was placed in an open beaker which was then put in an oven at 300° F. for six days. At the end of this exposure the grease had darkened considerably through oxidation of the lubricating oil, but had not thinned out. A portion of this heated grease was also placed in boiling water and showed no signs of oil separation after 90 days' exposure.

In contrast to these results a grease, prepared in the same manner from 13.3 parts by weight of the same hydrophobic estersil and 86.7 parts of the same mineral oil, disintegrated after 3 to 4 days' exposure in boiling water with a clean separation of the silica and mineral oil.

Further, an unesterified, finely divided silica was prepared as follows: A portion of a washed wet filter cake prepared in the same manner as described above for the preparation of the hydrophobic estersil was mixed with 3.2 volumes of acetone, stirred mechanically for 1 hour, and filtered on a Nutsche filter under vacuum. This process was repeated two more times using the same ratio of filter cake to acetone. After the third filtration the acetone-wet cake contained 3.2% water as determined by titration with Fischer reagent. The cake was then dried in a vacuum oven at 110° C. until no odor of acetone could be detected. The product was a white, hydrophilic powder. It had a specific surface area by nitrogen adsorption of 337 m.$^2$/g., and a hydroxylated surface area by methyl red dye adsorption of 334 m.$^2$/g. Thirteen and three-tenths parts by weight of this hydrophilic silica, 5 parts of the polymethyl phenylsiloxane of medium aromaticity (DC–550), and 81.7 parts by weight of the Mid-Continent solvent treated petroleum oil were compounded by the same method to obtain a lubricating grease. This grease disintegrated almost immediately in cold water, with a clean separation of the silica and oil.

*Examples 3–14.*—Greases were prepared exactly as described in Example 2, except that the type and proportion of polysiloxane was varied. The details of the preparation of these examples, as well as their resistance to boiling water, are given in the following table:

| Example No. | Polysiloxane Employed | Hydrophobic estersil of Example 2 | Polysiloxane | Mineral oil of Example 2 | Micropen. of Grease at 77° F. after Ink-milling | Days before Complete disintegration in boiling water (100° C.) |
|---|---|---|---|---|---|---|
| 2 | Polymethylphenyl siloxane (med. aromaticity) Visc. about 59.3 cs. at 100° F. (DC-550). | 13.3 | 5.0 | 81.7 | 71 | >90. |
| 3 | do | 13.3 | 1.7 | 85.0 | 71 | >>18 (test stopped). |
| 4 | do | 13.3 | 1.0 | 85.7 | 73 | >70. |
| 5 | do | 13.3 | 0.5 | 86.2 | 75 | 15-30 (gradually disintegrated). |
| 6 | do | 13.3 | 0.1 | 86.6 | 76 | 4. |
| 7 | Polymethylsiloxane viscosity about 100 cs. at 100° F. (DC-200). | 13.3 | 1.7 | 85.0 | 72 | >60. |
| 8 | do | 13.3 | 1.0 | 85.7 | 70 | >60. |
| 9 | do | 13.3 | 0.5 | 86.2 | 70 | 15-25 (gradually disintegrated). |
| 10 | do | 13.3 | 0.1 | 86.6 | 69 | 4-5. |
| 11 | Polymethylphenyl siloxane (high aromaticity) viscosity about 117 cs. at 100° F. (DC-710R). | 13.3 | 1.7 | 85.0 | 70 | >60. |
| 12 | do | 13.3 | 1.0 | 85.7 | 69 | 7-15 (gradually disintegrated). |
| 13 | do | 13.3 | 0.5 | 86.2 | 69 | 4-5. |
| 14 | do | 13.3 | 0.1 | 86.6 | 68 | 3-4. |

I claim:

1. A composition comprising an estersil and a silicone oil, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

2. A composition comprising an estersil, a silicone oil, and another water-insoluble lubricating oil, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

3. A composition comprising a silicone oil and an estersil, said estersil being a supercolloidal substrate coated with —OR groups, the substrate having a surface of silica and having a specific surface area of from 200 to 900 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

4. A composition comprising a silicone oil and an estersil, said estersil being a supercolloidal substrate coated with —OR groups, the substrate having a surface of silica and having a specified surface area of from 200 to 400 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

5. A lubricating composition comprising an estersil and a silicone oil, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

6. A composition comprising a silicone oil and an estersil, said estersil being a supercolloidal substrate coated with —OR groups, the substrate having a surface of silica and having a specific surface area of from 200 to 400 square meters per gram and being coated with at least 200 —OR groups per 100 square millimicrons of substrate surface area, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

7. A composition comprising a silicone oil and an estersil, said estersil being a supercolloidal substrate coated with —OR groups, the substrate having a surface of silica and having a specific surface area of from 1 to 900 square meters per gram and being coated with at least 200 —OR groups per 100 square millimicrons of substrate surface area, the coating of —OR groups being chemically bound to said silica, R being a hydrocarbon radical of from 2 to 18 caron atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

8. A composition comprising a silicone oil and an estersil, said estersil being a supercolloidal substrate coated with —OR groups, the substrate having a surface of silica and having a specific surface area of from 200 to 400 square meters per gram and being coated with at least 270 —OR groups per 100 square millimicrons of substrate surface area, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

9. A composition comprising a silicone oil and an estersil, said estersil being a supercolloidal substrate of porous, amorphous silica coated with —OR groups, the substrate having an average pore diameter of at least 4 millimicrons and a specific surface area of from 200 to 400 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture, the proportion of silicone oil in the composition being, by weight, at least 1 part per 100 parts of estersil for each 100 square meters of surface area per gram of estersil, and the estersil being present in an amount at least sufficient to increase the viscosity of the composition.

10. A composition comprising a silicone oil and an estersil, said estersil being a supercolloidal substrate of porous, amorphous silica coated with —OR groups, the substrate having an average pore diameter of at least 4 millimicrons and a specific surface area of from 200 to 400 square meters per gram and being coated with at least 270 —OR groups per 100 square millimicrons of substrate surface area, the coating of —OR groups being chemically bound to said silica, R being a hydrocarbon radical of from 2 to 18 carbon atoms wherein the carbon atom attached to oxygen is also attached to hydrogen, the proportion of silicone oil in the composition being, by weight, at least 1 part per 100 parts of estersil for each 100 square meters of surface area per gram of estersil and the estersil being present in an amount at least sufficient to increase the viscosity of the composition.

11. A composition comprising a silicone oil and an estersil, said estersil being a supercolloidal substrate of porous, amorphous silica coated with —OR groups, the substrate having an average pore diameter of at least 4 millimicrons and a specific surface area of from 200 to 900 square meters per gram and being coated with at least 270 —OR groups per 100 square millimicrons of substrate surface area, the coating of —OR groups being chemically bound to said silica, R being a hydrocarbon radical of from 2 to 18 carbon atoms wherein the carbon atom attached to oxygen is also attached to hydrogen, the proportion of silicone in the composition being, by weight, from 1 to 10 parts per 100 parts of estersil per 100 $m.^2/g.$ of estersil surface area, and the estersil being present in an amount at least sufficient to increase the viscosity of the composition.

12. A composition comprising a silicone oil and an estersil, said estersil being a supercolloidal substrate coated with a sufficient number of —OR groups to make it hydrophobic, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the proportion of silicone oil in the composition being, by weight, from 1 to 10 parts per 100 parts of estersil per 100 $m.^2/g.$ of estersil surface area, and the estersil being present in an amount at least sufficient to increase the viscosity of the composition.

13. A grease consisting essentially of a silicone oil and a sufficient proportion of an estersil to thicken the oil to a grease consistency, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the estersil being organophilic in that it is preferentially wetted by butanol in a butanol-water mixture.

14. A lubricating composition resistant to deterioration by boiling water, the composition comprising minor proportions of an estersil and a silicone oil and a major proportion of another lubricating oil, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the proportion of silicone oil in the composition being, by weight, at least 1 part per 100 parts of estersil for each 100 square meters of surface area per gram of estersil, and the estersil being present in an amount at least sufficient to increase the viscosity of the composition.

15. A lubricating composition comprising a silicone oil, another water-insoluble lubricating oil, and an estersil, said estersil being a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen, the proportion of silicone oil in the composition being, by weight, at least 1 part per 100 parts of estersil for each 100 square meters of surface area per gram of estersil, and the estersil being present in an amount sufficient to thicken the combined oils to a grease-like consistency.

No references cited.